(12) United States Patent
Park et al.

(10) Patent No.: US 12,001,998 B2
(45) Date of Patent: Jun. 4, 2024

(54) ELECTRONIC APPARATUS FOR PROCESSING INFORMATION FOR ITEM DELIVERY AND METHOD THEREOF

(71) Applicant: Coupang Corp., Seoul (KR)

(72) Inventors: Byoung Yong Park, Seoul (KR); Min Ji Lim, Seoul (KR); Seok Bum Lee, Seoul (KR)

(73) Assignee: Coupang Corp., Seoul (KR)

( * ) Notice: Subject to any disclaimer, the term of this patent is extended or adjusted under 35 U.S.C. 154(b) by 372 days.

(21) Appl. No.: 17/386,832

(22) Filed: Jul. 28, 2021

(65) Prior Publication Data

US 2022/0318745 A1 Oct. 6, 2022

(30) Foreign Application Priority Data

Apr. 5, 2021 (KR) .................. 10-2021-0043928

(51) Int. Cl.
*G06Q 10/0834* (2023.01)
*G06Q 10/083* (2024.01)
(Continued)

(52) U.S. Cl.
CPC ..... *G06Q 10/0834* (2013.01); *G06Q 10/0833* (2013.01); *G06Q 10/0838* (2013.01); *G06Q 10/087* (2013.01)

(58) Field of Classification Search
CPC ........... G06Q 10/0834; G06Q 10/0833; G06Q 10/0838; G06Q 10/087
See application file for complete search history.

(56) References Cited

U.S. PATENT DOCUMENTS 10,301,155 B2 5/2019 Dues et al.
10,822,169 B2 11/2020 Moulin et al.
(Continued)

FOREIGN PATENT DOCUMENTS

KR 1020020023986 A 3/2002
KR 1020030078446 A 10/2003
(Continued)

OTHER PUBLICATIONS

M. Merschformann, Decision rules for robotic mobile fulfillment systems, 2019, (Year: 2019).*

*Primary Examiner* — Resha Desai
*Assistant Examiner* — Ismail A Manejwala
(74) *Attorney, Agent, or Firm* — Banner & Witcoff, Ltd.

(57) ABSTRACT

Disclosed is an information processing method in an electronic apparatus, which includes acquiring, from a user, first information related to supply including information on a target fulfillment center and information on an item, confirming a delivery type of the supply, acquiring scheduled arrival time information of the item according to the supply according to a method corresponding to the confirmed delivery type of the supply, and providing second information including the information on the item and the scheduled arrival time information to the target fulfillment center, in which the acquiring of the scheduled arrival time information includes acquiring an item arrival time calculation model that is pre-trained, and determining the scheduled arrival time information based on the item arrival time calculation model.

18 Claims, 10 Drawing Sheets

(51) Int. Cl.
*G06Q 10/0833* (2023.01)
*G06Q 10/087* (2023.01)

(56) References Cited

U.S. PATENT DOCUMENTS

| | | | |
|---|---|---|---|
| 11,178,549 B1 | 11/2021 | Kim et al. | |
| 2012/0226624 A1 | 9/2012 | Song et al. | |
| 2013/0159208 A1 | 6/2013 | Song et al. | |
| 2019/0066041 A1* | 2/2019 | Hance | G05D 1/0297 |
| 2020/0118071 A1* | 4/2020 | Venkatesan | G06N 20/00 |
| 2021/0133666 A1* | 5/2021 | Eckman | G06T 7/62 |

FOREIGN PATENT DOCUMENTS

| | | |
|---|---|---|
| KR | 100910907 B1 | 8/2009 |
| KR | 1020120100601 A | 9/2012 |
| KR | 1020130058196 A | 6/2013 |
| KR | 101391998 B1 | 5/2014 |
| KR | 101410209 B1 | 6/2014 |
| KR | 101703526 B1 | 2/2017 |
| KR | 1020180067640 A | 6/2018 |
| KR | 1020180124526 A | 11/2018 |
| KR | 1020190049299 A | 5/2019 |
| KR | 102230394 B1 | 3/2021 |
| KR | 102295063 B1 | 8/2021 |

\* cited by examiner

| User | Fulfillment center | ~410 |
|---|---|---|
| BB Agency | XX Center | |

| Number of bundles | Total quantity | ~420 |
|---|---|---|
| 2 | 4 | |

430

| Bundle | SKU | Name of item | SKU Barcode | Quantity | Shipping time |
|---|---|---|---|---|---|
| Bundle 1 | 12345678 | Yellow dust protection mask | 15252536586088 | 2 | 2021.02.03. 16:44:03 |
| Bundle 2 | 12345679 | Dental mask | 15738575927384 | 2 | 2021.02.03. 16:44:03 |

| User | Fulfillment center | ~410 |
|---|---|---|
| BB Agency | XX Center | |

| Number of bundles | Total quantity | ~420 |
|---|---|---|
| 2 | 4 | |

430

| Bundle | SKU | Name of item | SKU Barcode | Quantity | Shipping time |
|---|---|---|---|---|---|
| Bundle 1 | 12345678 | Yellow dust protection mask | 15252536586088 | 2 | 2021.02.03. 16:44:03 |
| Bundle 2 | 12345679 | Dental mask | 15738575927384 | 2 | 2021.02.03. 16:44:03 |

| Vehicle identification information | ~510 |
|---|---|
| 12830587 | |

FIG. 6

| Courier agency | User | Fulfillment center |
|---|---|---|
| AA Agency | BB Agency | XX Center |

— 610    600

| Number of bundles | Total quantity |
|---|---|
| 2 | 4 |

— 420

430

| Bundle | SKU | Name of item | SKU Barcode | Quantity | Shipping time |
|---|---|---|---|---|---|
| Bundle 1 | 12345678 | Yellow dust protection mask | 15252536586088 | 2 | 2021.02.03. 16:44:03 |
| Bundle 2 | 12345679 | Dental mask | 15738575927384 | 2 | 2021.02.03. 16:44:03 |

| Bundle | Invoice number |
|---|---|
| Bundle 1 | 12345678 |
| Bundle 2 | 12345679 |

— 620

ELECTRONIC APPARATUS FOR PROCESSING INFORMATION FOR ITEM DELIVERY AND METHOD THEREOF

RELATED APPLICATION INFORMATION

The present application claims priority to and the benefit of Korean Patent Application No. 10-2021-0043928 filed on Apr. 5, 2021, and is incorporated by reference herein in its entirety.

TECHNICAL FIELD

The present disclosure relates to an electronic apparatus for processing information for item supply and a method thereof, and more particularly, to electronic apparatus, which acquires first information related to supply from a user, acquires scheduled arrival time information of an item according to supply based on a pre-trained item arrival time calculation model according to a method corresponding to a delivery type of supply, and provides second information including the information on the item and the scheduled arrival time information to a target fulfillment center, and a method thereof.

DESCRIPTION OF THE RELATED ART

Fulfillment centers are facilities for storing items for a short period or a long period for rapid delivery of the items. As e-commerce is activated, a need for the fulfillment centers is increasing, and furthermore, a demand for a plan for more effective use of the fulfillment centers is increasing.

Meanwhile, it is difficult to check scheduled arrival times of items before the items are actually received at the fulfillment centers, and even if information related to scheduled reception dates is received when the items are ordered from vendors that supply the items to the fulfillment centers, the items often do not arrive on the scheduled reception dates. In this case, there may be a problem that the fulfillment centers have difficulties in reception of the items at the fulfillment centers, excessive manpower is allocated for the reception, or inventory is not accurately identified.

In this regard, related art documents such as KR100910907B1 and KR20030078446A may be referenced.

DISCLOSURE OF THE INVENTION

An aspect is to provide an electronic apparatus, which acquires first information related to supply from a user, acquires scheduled arrival time information of an item according to supply based on a pre-trained item arrival time calculation model according to a method corresponding to a delivery type of the supply, and provides second information including the information on the item and the scheduled arrival time information to a target fulfillment center, and a method thereof.

The technical goals of the present disclosure are not limited to the aforementioned technical features, and other unstated technical goals may be inferred from example embodiments below.

According to an aspect, there is provided an information processing method in an electronic apparatus, which includes acquiring, from a user, first information related to supply including information on a target fulfillment center and information on an item, confirming a delivery type of the supply, acquiring scheduled arrival time information of the item according to the supply according to a method corresponding to the confirmed delivery type of the supply, and providing second information including the information on the item and the scheduled arrival time information to the target fulfillment center. The acquiring of the scheduled arrival time information includes acquiring an item arrival time calculation model trained in advance, and determining the scheduled arrival time information based on the item arrival time calculation model.

The scheduled arrival time information may be acquired based on the first information when the delivery type of the supply is a first type, and may be acquired based on the first information and third information received from a server related to a delivery corresponding to a second type based on the first information when the delivery type of the supply is the second type.

The third information may include delivery progress status information corresponding to the item.

The information processing method may further include determining manpower allocation information corresponding to the target fulfillment center based on the second information.

At least a part of the item may be delivered after being classified into one or more item bundles, and each of the one or more item bundles may correspond to the at least a part of the item being packaged into one unit.

The first information may further include at least one of quantity information of the item, type information of the item, and time information related to delivery of the item.

When the delivery type of the supply is a first type, the first information may further include identification information for identifying a vehicle provided for the supply and related to the user or the electronic apparatus, and reception of the item may be processed corresponding to a time at which the identification information for identifying the vehicle is received from the target fulfillment center.

The item arrival time calculation model may be trained based on at least one of fulfillment center information of an item that has been previously delivered, delivery route information of an item that has been previously delivered, time information of a time when an item has arrived at the fulfillment center, information on a vendor corresponding to a second type when the delivery type of the previous supply is the second type, location information of a sales office of the vendor corresponding to previous arrival of an item, and time information of a time when an item has arrived at the sales office.

The information processing method may further include further training the item arrival time calculation model based on arrival of the item at the target fulfillment center.

The information processing method may further include providing item identification information identifying the item to at least one of the user and the target fulfillment center in response to acquiring the first information, and when the item arrives, reception of the item may be processed at the target fulfillment center based on the item identification information.

The item identification information may be provided for each item bundle in which at least a part of the item is classified.

Specific item identification information corresponding to a specific item bundle may include at least one of quantity information of the item included in the specific item bundle and type information of the item included in the specific item bundle.

The item identification information may correspond to a vehicle provided for the supply and related to the user or the electronic apparatus when the delivery type of the supply is a first type.

The reception of the item may be processed in response to acquiring the item identification information at the target fulfillment center using a scanning device.

The item identification information may be acquired by moving the item on a preset path and positioning the scanning device to scan a specific region on a movement path of the item.

When the reliability of the user exceeds a preset threshold, the item identification information may be acquired, such that the reception of the item may be processed at the target fulfillment center, and when the reliability of the user is less than the preset threshold, the item identification information may be acquired and an inventory check is performed at the target fulfillment center, such that the reception of the item may be processed.

The inventory check may be performed at the target fulfillment center by comparing the first information with the item identification information.

According to another aspect, there is provided an electronic apparatus that processes information, which includes a transceiver, a memory configured to store an instruction, and a processor. The processor is connected to the transceiver and the memory, and acquires, from a user, first information related to supply including information on a target fulfillment center and information on an item, confirms a delivery type of the supply, acquires scheduled arrival time information of the item according to the supply according to a method corresponding to the confirmed delivery type of the supply, provides second information including the information on the item and the scheduled arrival time information to the target fulfillment center, acquires an item arrival time calculation model, which is pre-trained, for acquiring the scheduled arrival time information, and determines the scheduled arrival time information based on the item arrival time calculation model.

Details of other example embodiments are included in the detailed description and drawings.

According to an aspect, it is possible for an electronic apparatus for processing information for item supply and a method thereof to identify a scheduled reception date more accurately by acquiring scheduled arrival time information of an item and providing the scheduled arrival time information to a target fulfillment center, and accordingly, to effectively achieve the logistics management and the manpower management by managing the manpower for the reception of the item.

Effects are not limited to the aforementioned effects, and other effects not mentioned will be clearly understood by those skilled in the art from the description of the claims.

BRIEF DESCRIPTION OF THE DRAWINGS

FIG. 4 is a diagram illustrating first information acquired by the electronic apparatus according to an example embodiment.

FIG. 5 is an example diagram illustrating first information when a delivery type of the supply is a first type according to an example embodiment.

FIG. 6 is an example diagram illustrating first information when the delivery type of the supply is a second type according to an example embodiment.

DETAILED DESCRIPTION OF THE INVENTION

Figure 1:
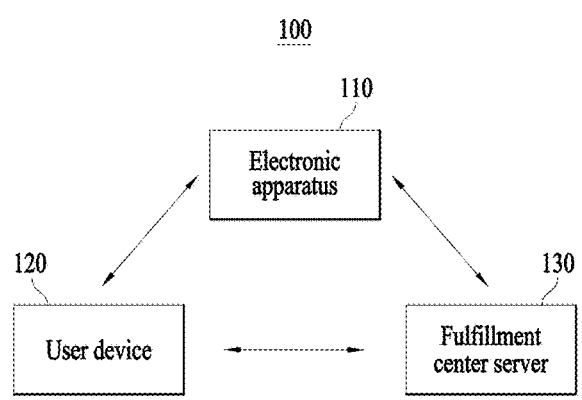
FIG. 1 is a schematic block diagram illustrating an information processing system for item supply according to an example embodiment.

General terms that are currently widely used are selected as terms used in example embodiments in consideration of functions in the present disclosure but may be changed depending on the intention of those skilled in the art or a judicial precedent, the emergence of a new technique, and the like. In addition, in specific cases, there may be terms arbitrarily chosen by the applicant. In this case, the meaning of such a term will be described in detail in a corresponding description portion. Therefore, the terms used in the present disclosure should be defined on the basis of the meanings of the terms and the content throughout the present disclosure rather than the simple names of the terms.

Throughout the specification, unless otherwise designated, "including" any component means that other components may be further included rather than excluding other components. In addition, the terms "unit," "module," and the like described in the specification refer to a processing unit of at least one function or operation and may be implemented by hardware or software or a combination of hardware and software.

The expression "at least one of a, b, and c" described throughout the specification may include "a alone," "b alone," "c alone," "a and b," "a and c," "b and c," or "all of a, b, and c."

A "terminal" described below may be implemented as a computer or a portable terminal that may access a server or other terminals through a network. Here, computers may include, for example, a notebook computer, a desktop computer, a laptop computer, and the like, which are equipped with a web browser, and portable terminals are wireless communication devices that ensure portability and mobility and may include, for example, all kinds of handheld-based wireless communication devices such as a communication-based terminal, a smartphone, and a tablet personal computer (PC) which support International Mobile Telecommunications (IMT), code division multiple access (CDMA), W-code division multiple access (W-CDMA), Long Term Evolution (LTE), etc.

Hereinafter, the example embodiments of the present disclosure will be described in detail with reference to the accompanying drawings so that those skilled in the art to which the present disclosure pertains may easily practice the present disclosure. However, the present disclosure may be implemented in various different forms and is not limited to the example embodiments described herein.

Hereinafter, the example embodiments of the present disclosure will be described in detail with reference to the accompanying drawings.

In describing the example embodiments, descriptions of technical contents that are well known in the technical field to which the present disclosure pertains and that are not directly related to the present disclosure will be omitted. This is to more clearly convey the gist of the present disclosure without ambiguity by omitting unnecessary descriptions.

For the same reason, some components in the accompanying drawings are exaggerated, omitted, or schematically illustrated. In addition, the size of each component does not entirely reflect the actual size. The same reference numerals are assigned to the same or corresponding components in each drawing.

Various advantages and features of the present disclosure and methods accomplishing them will become apparent from the following description of the example embodiments with reference to the accompanying drawings. However, the present disclosure is not limited to the example embodiments disclosed herein but may be implemented in various forms. The example embodiments make contents of the present disclosure thorough and are provided so that those skilled in the art can easily understand the scope of the present disclosure. Therefore, the present disclosure will be defined by the scope of the appended claims. Throughout the specification, like reference numerals denote like components.

In this case, it will be appreciated that each block of a processing flowchart and combinations of the flowcharts may be executed by computer program instructions. Since these computer program instructions may be installed in a processor of a general computer, a special purpose computer, or other programmable data processing apparatuses, these computer program instructions executed through the processor of the computer or the other programmable data processing apparatuses create a means for performing functions described in the block(s) of the flowchart. Since these computer program instructions may also be stored in a computer usable or computer readable memory of a computer or other programmable data processing apparatuses in order to implement the functions in a specific scheme, the computer program instructions stored in the computer usable or computer readable memory can also produce manufacturing articles including an instruction means for performing the functions described in the block(s) of the flowchart. Since the computer program instructions may also be installed in the computer or the other programmable data processing apparatuses, the instructions perform a series of operation steps on the computer or the other programmable data processing apparatuses to create processes executed by the computer, thereby running the computer, or the other programmable data processing apparatuses may also provide operations for performing the functions described in the block(s) of the flowchart.

In addition, each block may indicate some modules, segments, or code including one or more executable instructions for executing a specific logical function(s). Further, it is to be noted that functions described in the blocks occur regardless of a sequence in some alternative example embodiments. For example, two blocks that are consecutively shown may in fact be simultaneously performed or performed in a reverse sequence depending on corresponding functions.

FIG. 1 is a schematic diagram illustrating an information processing system for item supply according to an example embodiment.

According to various example embodiments, an information processing system 100 for item supply may include an electronic apparatus 110, a user device 120, and a fulfillment center server 130. According to an example embodiment, the information processing system 100 for item supply may further include a network that supports transmission and reception of information between at least a part of the electronic apparatus 110, the user device 120, and the fulfillment center server 130.

Each of the electronic apparatus 110, the user device 120, and the fulfillment center server 130 may include a transceiver, a memory, and a processor. In addition, each of the electronic apparatus 110, the user device 120, and the fulfillment center server 130 refers to a unit for processing at least one function or operation, which may be implemented with hardware, software, or a combination of hardware and software. Meanwhile, in the example embodiment, the electronic apparatus 110, the user device 120, and the fulfillment center server 130 are referred to as separate devices or servers, but may be a logically divided structure and may be implemented by functions separated in one server.

The separated device or server is named as the user device 120 and the fulfillment center server 130 for convenience of description. However, the user device 120 may include a server corresponding to a user, and the fulfillment center server 130 is not limited to a server and also may include various types of devices corresponding to a fulfillment center. According to an example embodiment, the electronic apparatus 110, the user device 120, and the fulfillment center server 130 may include a plurality of computer systems or computer software implemented as a network server. For example, at least a part of the electronic apparatus 110, the user device 120, and the fulfillment center server 130 may be referred to as a computer system and computer software which are connected to a low-level device capable of communicating with another network server through a computer network such as an Intranet or Internet, receive an operation execution request, and execute the operation for the operation execution request to provide execution results. In addition, at least a part of the electronic apparatus 110, the user device 120, and the fulfillment center server 130 may be understood as a broad concept including a series of application programs and various built-in databases capable of operating on the network server. For example, at least a part of the electronic apparatus 110, the user device 120, and the fulfillment center server 130 may be implemented using various network server programs that are provided according to an operating system such as DOS, Windows, Linux, UNIX, or MacOS.

The electronic apparatus 110 is a device that processes information for item supply. The electronic apparatus 110 acquires, from a user, first information related to supply including target fulfillment center information and information on an item. The user who acquires the first information may correspond to the user device 120 included in the information processing system 100 for item supply. Hereinafter, for convenience of description, an example embodiment in which data is transmitted and received between the electronic apparatus 110 and the user device 120 will be described.

The electronic apparatus 110 may confirm a delivery type of the supply, and acquire scheduled arrival time information of an item according to the supply according to a method corresponding to the confirmed delivery type of the supply. The electronic apparatus 110 acquires a pre-trained item arrival time calculation model, and acquires the scheduled arrival time information by determining the scheduled arrival time information based on the pre-trained item arrival time calculation model. The pre-trained item arrival time calculation model may be a calculation model based on machine learning but is not necessarily limited to the machine-learned model, and may include various types of calculation models.

A target fulfillment center targeted for item supply is determined based on target fulfillment center information included in the first information, and the electronic apparatus 110 may acquire the scheduled arrival time information of the item by calculating a scheduled time for the item to arrive at the target fulfillment center.

The electronic apparatus 110 provides second information including the information on the item and the scheduled arrival time information to the target fulfillment center. In this regard, the electronic apparatus 110 may provide the second information to the fulfillment center server 130 corresponding to a server of the target fulfillment center. Hereinafter, for convenience of description, an example embodiment in which data is transmitted and received between the electronic apparatus 110 and the fulfillment center server 130 will be described.

The user device 120 may be a device that performs information processing related to supply of the item. The user device 120 is a device managed by the user, and the user may correspond to a vendor that supplies the item. The user device 120 may transmit the first information related to supply including the target fulfillment center information and the information on the item to the electronic apparatus 110 and, in addition to this, may process information related to the supply of the item such as receiving item identification information (to be described later) from the electronic apparatus 110 or transmitting the item identification information to the fulfillment center server 130.

The fulfillment center server 130 may be a server of the fulfillment center among one or more fulfillment centers associated with the electronic apparatus 110, corresponding to the target fulfillment center information included in the first information. The fulfillment center server 130 may be a device managed by the fulfillment center. The fulfillment center server 130 may manage the reception of the item related to arrival of the item to the fulfillment center. Further, according to the example embodiment, the fulfillment center server 130 may process information related to the reception and management of the item, such as managing the release of the received item or performing inventory checks of the item.

The network may serve to connect the electronic apparatus 110 to the user device 120, the fulfillment center server 130, or other external devices. For example, the network may provide a connection route so that the user device 120 is connected to the electronic apparatus 110 to transmit and receive packet data to and from the electronic apparatus 110.

Operations related to a series of information processing methods for item supply according to various example embodiments may be implemented by a single physical device and may be implemented in a way that a plurality of physical devices are organically combined. For example, a part of components included in the information processing system 100 for item supply may be implemented by any one of the physical devices, and the remaining part thereof may be implemented by other physical devices. For example, any one of the physical devices may be implemented as a part of the electronic apparatus 110, and other physical devices may be implemented as a part of the user device 120, a part of the fulfillment center server 130, or a part of other external devices. In some cases, each of the components included in the information processing system 100 for item supply may be implemented so that the components are distributed and arranged on the different physical devices, the distributed and arranged components are organically combined to execute functions and operations of the information processing system 100 for item supply. For example, the electronic apparatus 110 of the present specification includes at least one sub-device, some operations described as being performed by the electronic apparatus 110 may be executed by a first sub-device, and some other operations may be executed by a second sub-device.

Figure 2:
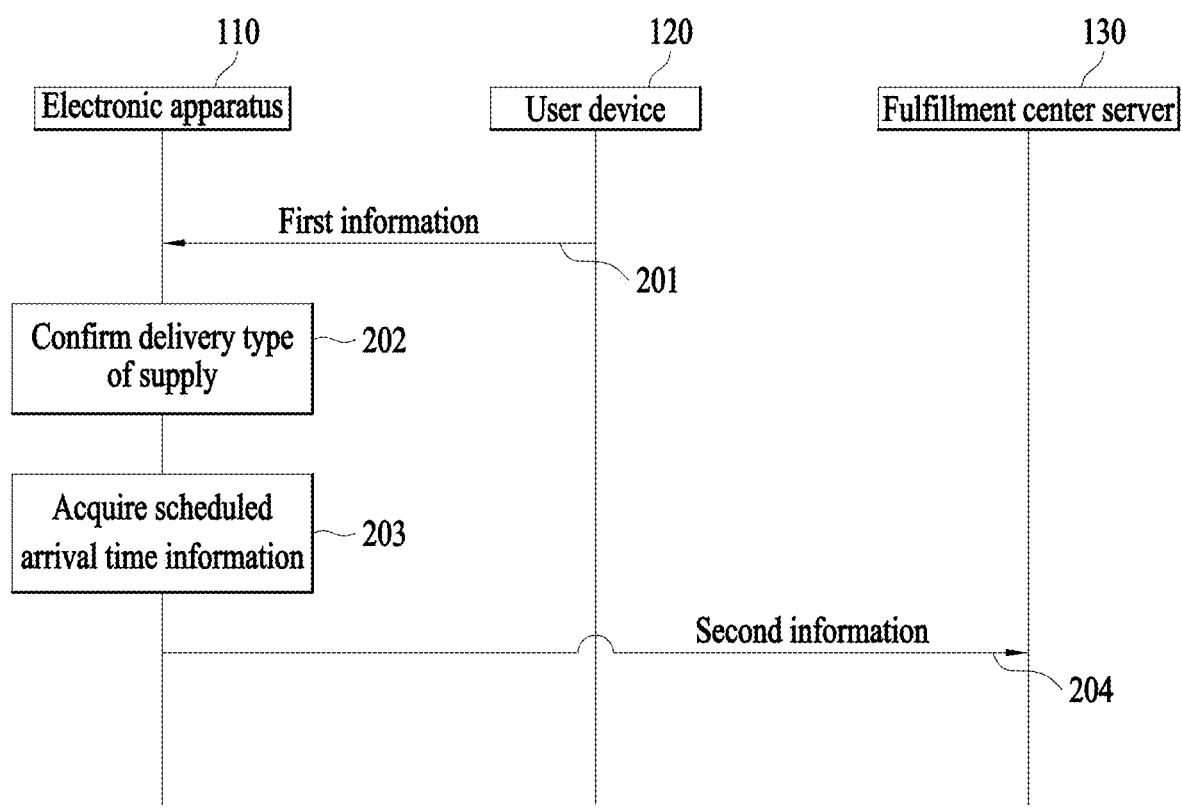
FIG. 2 is an operation flowchart illustrating an information processing method of an electronic apparatus in the information processing system for item supply according to an example embodiment.

FIG. 2 is an operation flowchart illustrating an information processing method of an electronic apparatus in the information processing system for item supply according to an example embodiment.

Referring to FIG. 2, in operation 201, the electronic apparatus 110 according to the example embodiment acquires first information from the user device 120. By acquiring the first information, the electronic apparatus 110 may acquire the target fulfillment center information and acquire information on an item to be supplied by the user.

A more detailed example related to the first information will be described later in FIG. 4.

In operation 202, the electronic apparatus 110 confirms the delivery type of item supply. According to an example embodiment, the delivery type of item supply may be determined based on the first information. For example, when the first information includes vehicle identification information, the delivery type of item supply may be determined as a first type, and when the first information includes vendor information (for example, courier agency information) or an invoice number corresponding to a second type, the delivery type of item supply may be determined as a second type. Alternatively, the first information may explicitly disclose the delivery type of item supply. In this regard, the first type may correspond to a case of delivering the item using a vehicle provided for supply and related to the user or the electronic apparatus 110, and the second type may correspond to a case of delivering the item through an outside agency such as a courier agency.

In operation 203, the electronic apparatus 110 acquires scheduled arrival time information of the item according to supply according to a method corresponding to the confirmed delivery type of the supply. Specifically, when the delivery type of the supply is the first type, the electronic apparatus 110 may acquire the scheduled arrival time information based on the first information. On the other hand, when the delivery type of the supply is the second type, the electronic apparatus 110 may acquire the scheduled arrival time information based on at least one of the first information and third information received from a server related to the delivery corresponding to the second type. In this case, the third information may be information received based on the first information.

According to an example embodiment, the third information may include delivery progress status information corresponding to the item. For example, the third information corresponds to an invoice number given by the vendor corresponding to the second type, and the delivery status of the item may be confirmed based on the invoice number.

According to the example embodiment, even when the delivery type of the supply is the first type, the electronic apparatus 110 may acquire the scheduled arrival time information further based on the delivery progress status information. For example, the electronic apparatus 110 may acquire the delivery progress status information based on global positioning system (GPS) information on a driver terminal of a vehicle and GPS information on the vehicle, and acquire the scheduled arrival time information further based on the delivery progress status information.

A more detailed example related to the first information corresponding to the delivery type of item supply will be described later in FIGS. 5 and 6.

The electronic apparatus 110 acquires a pre-trained item arrival time calculation model and determines the scheduled arrival time information based on the pre-trained item arrival time calculation model. The item arrival time calculation model according to an example embodiment may be trained based on at least one of fulfillment center information of an item that has been previously delivered, delivery route information of an item that has been previously delivered, time information of an item that has previously arrived at the fulfillment center, vendor information corresponding to the second type when the delivery type of the previous supply is the second type, location information of a sales office of the vendor corresponding to previous arrival of an item, and time information of an item that has arrived at the sales office. The time information of an item that has arrived at the fulfillment center may be time information including a day or season to be delivered.

At least a part of information for training the item arrival time calculation model may be information acquired from the server related to the delivery corresponding to the second type. In addition, at least a part of information for training the item arrival time calculation model may be information acquired from at least one of a user who has previously supplied the item and a fulfillment center where the item has previously arrived.

In operation 204, the electronic apparatus 110 provides second information including the information on the item and the scheduled arrival time information to the fulfillment center server 130. According to an example embodiment, the fulfillment center server 130 may determine manpower allocation information corresponding to the scheduled arrival time of the item based on the second information.

According to an example embodiment, the electronic apparatus 110 may determine the manpower allocation information corresponding to the target fulfillment center based on the second information. In this case, the electronic apparatus 110 may transmit the manpower allocation information to the fulfillment center server 130.

The manpower allocation information may be information including manpower allocation in the target fulfillment center based on at least one of a time, a location, and a work type. In addition, the manpower allocation information may be information including at least one of the number of people to be allocated, a skill level of person to be allocated, and an employment type of person to be allocated (such as permanent/contract or full-time/part-time). For example, the manpower allocation information may correspond to information indicating that two unskilled people and one skilled person are allocated to a work area for receiving fresh food on February 3 at 17:00.

At least a part of the items delivered to the target fulfillment center from the user may be delivered after being classified into one or more item bundles. Each of one or more item bundles may correspond to at least a part of the items to be delivered being packaged into one unit.

When the items arrive at the target fulfillment center, the electronic apparatus 110 may further train the item arrival time calculation model according to an example embodiment in response to the item arrival. The item arrival time calculation model may be trained based on at least one of fulfillment center information of an arrived item, time information of an item that has arrived at the fulfillment center, and vendor information corresponding to the second type when the delivery type of the supply is the second type, location information of a sales office of a vendor corresponding to an item arrival, and time information of an item that has arrived at the sales office. At least a part of information for training the item arrival time calculation model may be information including the third information that is acquired from the server related to the delivery corresponding to the second type. In addition, at least a part of information for training the item arrival time calculation model may be information acquired from at least one of the user device 120 and the fulfillment center server 130.

Figure 3:
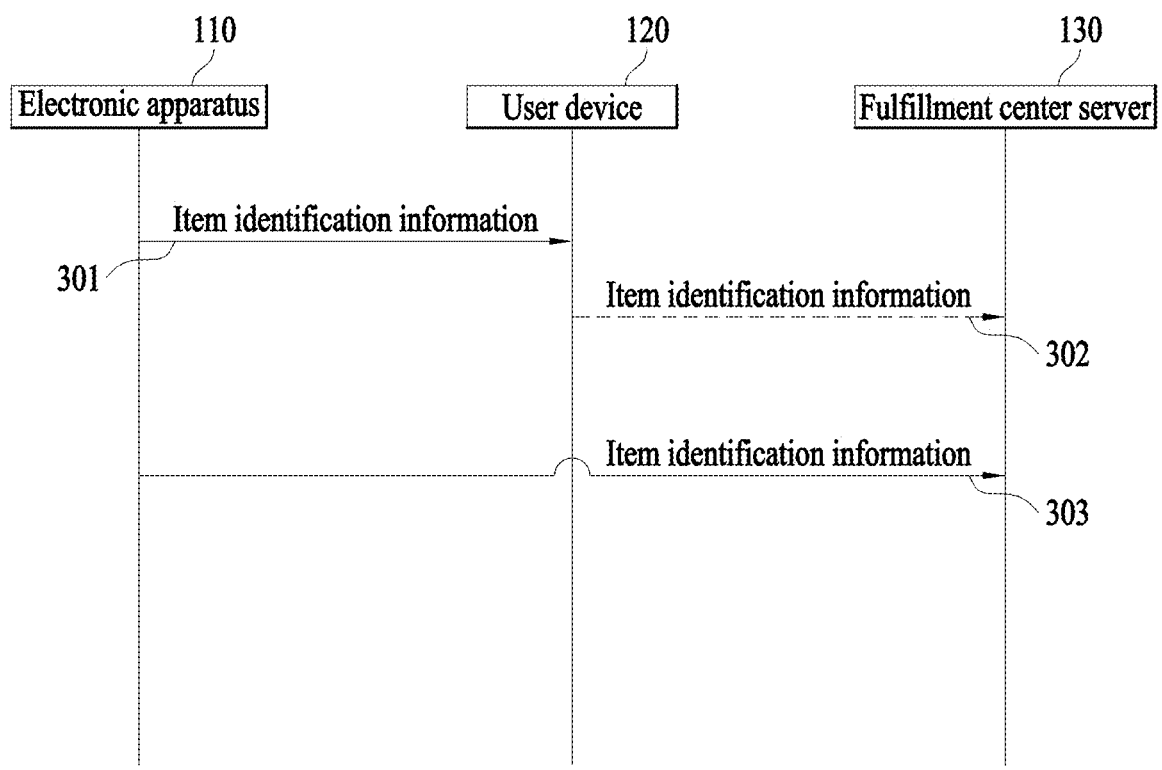
FIG. 3 is an operation flowchart illustrating an operation of transmitting item identification information by the electronic apparatus in the information processing system for item supply according to an example embodiment.

FIG. 3 is a flowchart illustrating an operation of transmitting item identification information by the electronic apparatus in the information processing system for item supply according to an example embodiment.

Referring to FIG. 3, the electronic apparatus 110 according to the example embodiment may provide item identification information capable of identifying the item to at least one of the user device 120 and the fulfillment center server 130 in response to acquiring the first information in operations 301 and 303. According to an example embodiment, the user who receives the item identification information may attach an object corresponding to the item identification information to the item. The object corresponding to the item identification information may correspond to a label (for example, film or paper) on which the item identification information is recorded or printed. According to an example embodiment, the object corresponding to the item identification information may correspond to a barcode including the item identification information.

According to the example embodiment, the fulfillment center server 130 may receive the item identification information from the electronic apparatus 110 in operation 303 or receive the identification information from the user device 120 in operation 302. The item identification information may be received through a network or in the form of a physical object. According to an example embodiment, the user device 120 attaches the object corresponding to the item identification information to the item and transmits the item to which the object is attached to the target fulfillment center, and thus, the item identification information may be transmitted to the fulfillment center server 130.

According to an example embodiment, the item identification information may be provided for each item bundle in which at least a part of the items is classified. For example, when an item includes an item bundle 1 in which two yellow dust protection masks are bundled and an item bundle 2 in which two dental masks are bundled, item identification information 1 may be provided for the item bundle 1, and item identification information 2 may be provided for the item bundle 2.

According to an example embodiment, specific item identification information corresponding to a specific item bundle may include at least one of quantity information of the item included in the specific item bundle and type information of the item included in the specific item bundle. For example, when an item includes an item bundle 1 in which two yellow dust protection masks are bundled and an item bundle 2 in which two dental masks are bundled, the item identification information 1 provided for the item bundle 1 may include information such as "yellow dust protection mask, two," and the item identification information 2 may include information such as "dental mask, two."

According to an example embodiment, when the delivery type of the supply is the first type, the item identification information may correspond to a vehicle provided for supply and related to the user or the electronic apparatus 110. For example, when the delivery type of the supply is the first type, item identification information provided may include information such as "vehicle identification information: 12830587."

According to an example embodiment, when the delivery type of the supply is the first type, the same item identification information may be provided for each item bundle. In this case, the item identification information provided may include information indicating all components included in the item, such as "two dental masks" and "two yellow dust protection masks."

According to the example embodiment, the item identification information may be provided in various ways, such as being provided for separate components that the item includes rather than the item bundle, without being limited to the example embodiment described above.

When the item arrives, reception of the item may be processed at the target fulfillment center based on the item identification information. According to an embodiment, the electronic apparatus 110 may determine the reliability of the user and process the reception of the item based on different methods depending on the reliability of the user. For example, when the reliability of the user exceeds a preset threshold, the item identification information is acquired, such that the reception of the item may be processed at the target fulfillment center. In contrast, when the reliability of the user is less than the preset threshold, the item identification information is acquired and an inventory check is performed at the target fulfillment center, such that the reception of the item is processed.

The reliability of the user may be determined based on the previous delivery number and frequency of the user, accuracy of the item identification information that has been previously transmitted by the user, accuracy of the first information that has been previously transmitted by the user, and the like, and a method of determining the reliability of the user is not limited to a specific method.

In this regard, the inventory check at the target fulfillment center may be performed by a manager of the target fulfillment center or by the fulfillment center server 130. The inventory check may be performed by comparing the first information with the item identification information. When there is a part where the first information and the item identification information do not match, it is assumed that the item identification information for the part is wrong, and the person allocated for the reception may directly check the type and quantity of the item.

According to an example embodiment, when the item identification information may be received in the form of the physical object, item identification information may be acquired using a scanning device at the target fulfillment center, and the reception of the item may be processed in response to acquiring the item identification information.

A more detailed example related to acquiring the item identification information using the scanning device will be described later in FIG. 8.

FIG. 4 is a diagram illustrating first information acquired by the electronic apparatus according to an example embodiment.

Referring to FIG. 4, an example 400 of the first information according to the example embodiment is illustrated. The first information includes target fulfillment center information and information on the item. For example, the reference number 410 may include target fulfillment center information such as "fulfillment center: XX center."

The information on the item included in the first information may further include at least one of quantity information of the item, type information of the item, and time information related to item delivery. For example, the reference number 420 may include quantity information of the item such as "total quantity: 4," and the reference number 430 may include quantity information such as "quantity: 2." In addition, the reference number 430 may include type information of the item such as "SKU: 12345678, name of item: yellow dust protection mask, SKU barcode: 15252536586088," "SKU: 12345679, name of item: dental mask, SKU barcode: 15738575927384." In this regard, SKU is the abbreviation for Stock Keeping Unit and may correspond to a code for managing an item unit. In addition, the reference number 430 may include time information related to item delivery, such as "shipping time: 2021.02.03. 16:44:03."

According to an example embodiment, the first information may further include information related to the item bundle. For example, the reference number 420 may include item bundle information such as "number of bundles: 2," the reference number 430 may include item quantity information for each item bundle such as "bundle 1" and "bundle 2," type information of the item, and time information related to item delivery.

In addition, the first information may further include various pieces of information of user information or the like, such as "user: BB agency."

Further referring to FIG. 5, an example 500 of the first information when the delivery type of the supply according to an example embodiment is the first type is illustrated. In this case, the first information may further include identification information for identifying a vehicle provided for supply and related to the user or the electronic apparatus 110. For example, the reference number 510 may include vehicle identification information such as "vehicle identification information: 12830587."

The reception of the item may be processed corresponding to a time at which the identification information for identifying the vehicle is received from the target fulfillment center.

Further referring to FIG. 6, an example 600 of the first information when the delivery type of the supply according to an example embodiment is the second type is illustrated. In this case, the first information may include information related to a location of the item. For example, the reference number 610 may include an invoice number such as "invoice number: 12345678" and "invoice number: 12345679," and a real-time location or a recent location may be confirmed based on the invoice number.

Figure 7:
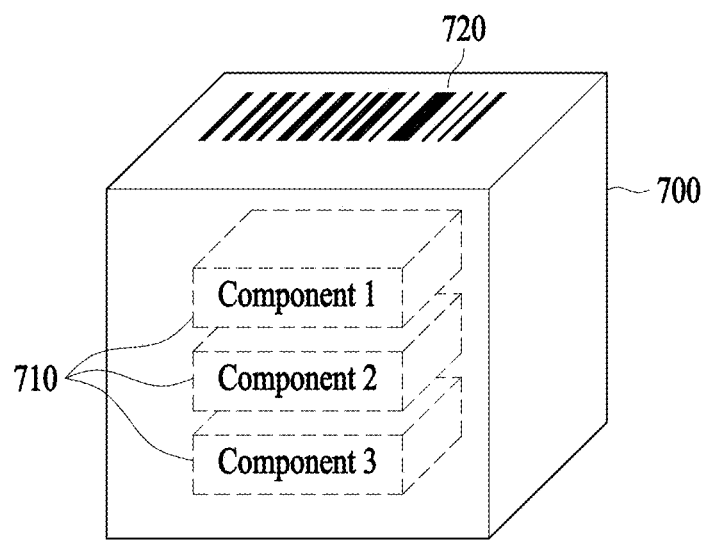
FIG. 7 is an example diagram illustrating an item bundle and item identification information according to an example embodiment.

FIG. 7 is a diagram illustrating an item bundle and item identification information according to an example embodiment.

Referring to FIG. 7, as described above, according to the example embodiment, at least a part of the items delivered from the user to the target fulfillment center may be delivered after being classified into one or more item bundles 700. Each of one or more item bundles may correspond to one or more components, which is at least a part of the items, being packaged into one unit 710. For a plurality of components included in the item, each component may not belong to two or more item bundles.

At least a part of the items is classified into item bundles, such that the components belonging to a specific item bundle may not be mixed with other components. To this end, it is possible to provide a storage space in which the item bundles are physically blocked from the outside. For example, the item bundle may correspond to a sealed courier box or the like. However, each item bundle may not be completely and physically blocked from the outside when it is more than likely that the components belonging to a specific item bundle will not be mixed with other components. For example, when a loading space of the vehicle is separated with fixed partitions, each space separated by the partition may correspond to the item bundle.

According to an example embodiment, the item bundle may include an object corresponding to the item identification information. For example, a barcode 720 including the item identification information may be attached to the item bundle.

Figure 8:
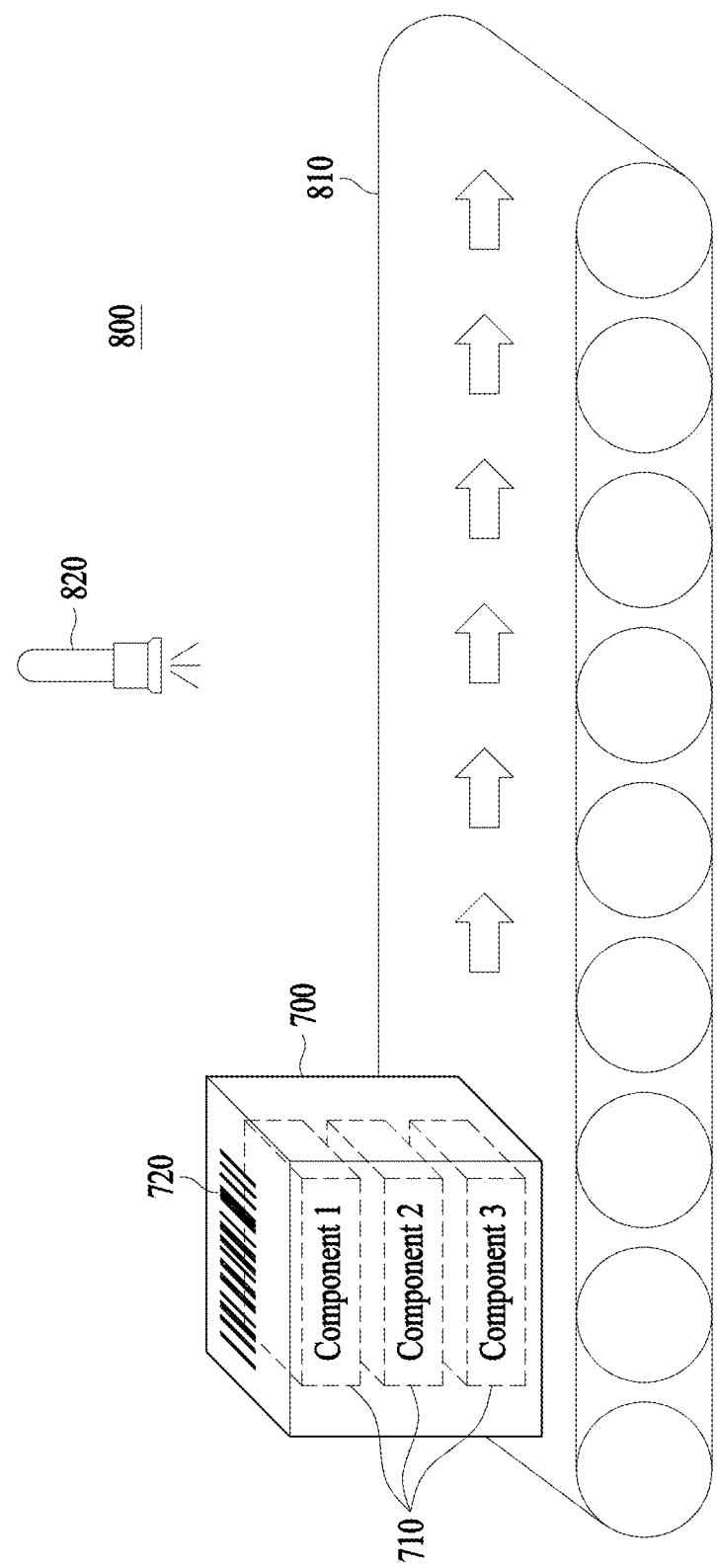
FIG. 8 is an example diagram illustrating an operation in which the item identification information is acquired using a scanning device and reception of the item is processed according to an example embodiment.

FIG. 8 is a diagram illustrating an operation in which the item identification information is acquired using a scanning device and reception of the item is processed according to an example embodiment.

Referring to FIG. 8, the item identification information may be acquired using a scanning device 820 according to the example embodiment, and the reception of the item may be processed in response to acquiring the item identification information. The scanning device 820 may be a device that reads information included in the object corresponding to the item identification information. For example, the scanning device 820 may be a device that reads information by identifying characters, numbers, and the like that are recorded or printed on the item identification information. Alternatively, the scanning device 820 may be a device that reads electronic information of a barcode including the item identification information.

According to an example embodiment, the item identification information may be acquired by moving the item on a preset path and positioning the scanning device 820 to scan a specific area on a movement path of the item as indicated by reference numeral 800. For example, a conveyor belt 810 is installed so that the item or item bundle moves on the fixed path, the scanning device 820 is disposed to scan a specific region on the conveyor belt, and the item or item bundle is placed on the conveyor belt 810 so that the scanning device 820 scans the object corresponding to the item identification information including the item or item bundle when the object enters a specific region. Therefore, the item identification information may be acquired as the item or item bundle moves on the conveyor belt 810, and in response to this, the reception of the item may be processed.

Figure 9:
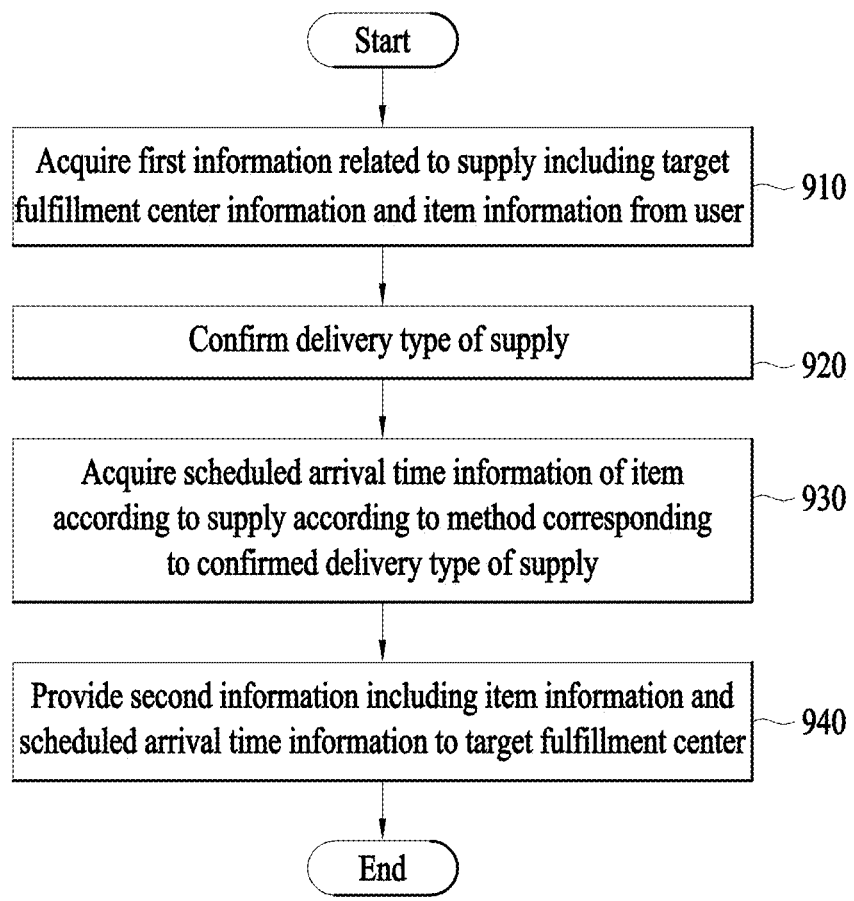
FIG. 9 is an operation flowchart illustrating an information processing method of the electronic apparatus according to an example embodiment.

FIG. 9 is an operation flowchart illustrating an information processing method of the electronic apparatus according to an example embodiment.

Referring to FIG. 9, in operation 910, the electronic apparatus 110 according to the example embodiment acquires, from the user, first information related to supply including target fulfillment center information and information on the item. In this case, the electronic apparatus 110 may acquire the first information from the user device 120.

The electronic apparatus 110 confirms a delivery type of the supply in operation 920 and acquires scheduled arrival time information of the item according to the supply according to a method corresponding to the confirmed delivery type of the supply in operation 930. Specifically, the electronic apparatus 110 acquires a pre-trained item arrival time calculation model and determines the scheduled arrival time information based on the item arrival time calculation model.

In operation 940, the electronic apparatus 110 provides second information including the information on the item and the scheduled arrival time information to the target fulfillment center. In this case, the electronic apparatus 110 may provide the second information to the fulfillment center server 130.

Figure 10:
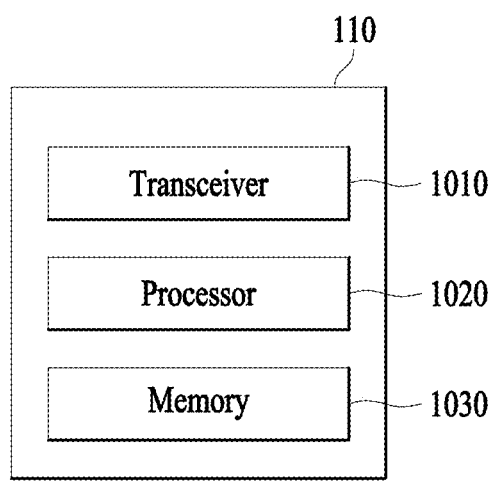
FIG. 10 is an example diagram illustrating a configuration of the electronic apparatus for processing information for item supply according to an example embodiment.

FIG. 10 is a diagram illustrating a configuration of an electronic apparatus for processing item supply information according to an example embodiment.

Referring to FIG. 10, the electronic apparatus 110 includes a transceiver 1010, a processor 1020, and a memory 1030. The electronic apparatus 110 may be connected to the user device 120, the fulfillment center server 130, other external devices, and the like through the transceiver 1010, and exchange data with each other.

The processor 1020 may include at least one device described above with reference to FIGS. 1 to 9, or execute at least one method described above with reference to FIGS. 1 to 9. The memory 1030 may store information for executing at least one method described above with reference to FIGS. 1 to 9. The memory 1030 may be a volatile memory or a non-volatile memory.

The processor 1020 may execute a program and control the electronic apparatus 110 for providing information. The program executed by the processor 1020 may be stored in the memory 1030.

In addition, the electronic apparatus 110 of an example embodiment may provide, to the user device 120, a user interface (UI) capable of providing information to the user or provide, to the fulfillment center server 130, a UI capable of providing information to the fulfillment center.

Meanwhile, the example embodiment of the present disclosure has been disclosed in the present specification and drawings, and although specific terms are used, these are merely used in a general sense to easily describe the technical content of the present disclosure and to aid understanding of the present disclosure but is not intended to limit the scope of the present disclosure. It is obvious to those of ordinary skill in the art to which the present disclosure pertains that other modifications based on the technical idea of the present disclosure can be implemented in addition to the example embodiments disclosed herein.

The electronic apparatus or terminal according to the above-described example embodiments may include a processor, a memory that stores and executes program data, a permanent storage such as a disk drive, a communication port for communication with an external device, a touch panel, a key, a user interface device such as a button, and the like. Methods implemented as software modules or algorithms may be stored on a computer-readable recording medium as computer-readable code or program instructions executable on the processor. Here, examples of the computer-readable recording medium may include magnetic storage media (for example, a read-only memory (ROM), a random-access memory (RAM), a floppy disk, a hard disk, etc.), optical reading media (for example, a compact disk (CD)-ROM or a digital versatile disc (DVD)), and the like. The computer-readable recording medium may be distributed in computer systems connected to each other through a network, and as a result, the computer-readable code may be stored and executed in a distributed manner. The medium may be readable by a computer, stored in a memory, and executed on a processor.

The present example embodiment may be represented by functional block configurations and various processing operations. These functional blocks may be implemented by various numbers of hardware and/or software components that execute specific functions. For example, the example embodiment may employ integrated circuit configurations, such as a memory, processing, logic, and a look-up table, capable of executing various functions by control of one or more microprocessors or other control devices. Similar to executing the components with software programming or software elements, the present example embodiment can be implemented with programming or scripting languages such as C, C++, Java, Assembly, and Python including various algorithms implemented by a combination of data structures, processes, routines or other programming configurations. Functional aspects may be implemented with algorithms executed on one or more processors. In addition, the present example embodiment may employ a conventional technology for electronic environment setting, signal processing, and/or data processing, and the like. Terms such as "mechanism," "element," "means," and "configuration" may be used broadly and are not limited to mechanical and physical configurations. The terms may include the meaning of a series of routines of software in connection with a processor or the like.

The above-described example embodiments are merely examples, and other example embodiments may be implemented within the scope of the following claims.

What is claimed is:

1. An information processing method in an electronic apparatus, the information processing method comprising:
   receiving, from a device of a user that supplies items, first information related to supply including (i) information on a target fulfillment center to which an item is to be supplied and (ii) information on the item;
   determining, based on the first information, a delivery type of the supply;
   predicting scheduled arrival time information of the item according to the supply according to a method corresponding to the determined delivery type of the supply, wherein the predicting the scheduled arrival time information comprises:
      training, using training data corresponding to predicting scheduled arrival time information for an item, a machine learning model to predict scheduled arrival time information based on the first information, the delivery type, and the information on the target fulfillment center;
      predicting, using the trained machine learning model and based on the first information, the delivery type, and the information on the target fulfillment center, scheduled arrival time information for the item; and
      providing second information including the information on the item and the predicted scheduled arrival time information to the device corresponding to the target fulfillment center;
   acquiring a reliability score corresponding to the user;
   based on a determination that the reliability score fails to satisfy a threshold, transmitting, to the device corresponding to a target fulfillment center, an indication to perform an inventory check at the target fulfillment center when the item is processed;
   determining manpower allocation information corresponding to the target fulfillment center based on the second information;
   retraining, based on the manpower allocation information corresponding to the target fulfillment center, the machine learning model;
   predicting, based on retrained machine learning model, an updated scheduled arrival time information for the item; and
   based on predicting the updated scheduled arrival time information, transmit the updated scheduled arrival time information to the target fulfillment center.

2. The information processing method of claim 1, wherein the predicted scheduled arrival time information is determined based on the first information when the delivery type of the supply is a first type and is determined based on the first information and third information received from a server related to a delivery corresponding to a second type based on the first information when the delivery type of the supply is the second type.

3. The information processing method of claim 2, wherein the third information comprises delivery progress status information corresponding to the item.

4. The information processing method of claim 1,
   wherein at least a part of the item is delivered after being classified into one or more item bundles, and
   wherein each of the one or more item bundles corresponds to the at least a part of the item being packaged into one unit.

5. The information processing method of claim 1, wherein the first information further comprises at least one of quantity information of the item, type information of the item, or time information related to delivery of the item.

6. The information processing method of claim 1, further comprising:
   determining, based on the determination that the delivery type of the supply is a first type, information for identifying a vehicle provided for the supply in association with the user or the electronic apparatus,
   wherein reception of the item is processed corresponding to a time at which the identification information for identifying the vehicle is received from the target fulfillment center.

7. The information processing method of claim 1, wherein the machine-learning model is trained based on at least one of:
   fulfillment center information of an item that has been previously delivered;
   delivery route information of an item that has been previously delivered;
   time information of a time when an item has arrived at the fulfillment center;
   information on a vendor corresponding to a second type when the delivery type of a previous supply is the second type;
   location information of a sales office of the vendor corresponding to previous arrival of an item; or
   time information of a time when an item has arrived at the sales office.

8. The information processing method of claim 1, further comprising:
   further training the machine learning model based on actual arrival of the item at the target fulfillment center.

9. The information processing method of claim 1, further comprising:

providing item identification information identifying the item to at least one of the user or the target fulfillment center in response to acquiring the first information, wherein, when the item arrives, reception of the item is processed at the target fulfillment center based on the item identification information.

10. The information processing method of claim 9, wherein the item identification information is provided for each item bundle in which at least a part of the item is classified.

11. The information processing method of claim 10, wherein specific item identification information corresponding to a specific item bundle comprises at least one of quantity information of the item included in the specific item bundle or type information of the item included in the specific item bundle.

12. The information processing method of claim 9, wherein the item identification information corresponds to a vehicle provided for the supply in association with the user or the electronic apparatus when the delivery type of the supply is a first type.

13. The information processing method of claim 9, wherein the reception of the item is processed in response to acquiring the item identification information at the target fulfillment center using a scanning device.

14. The information processing method of claim 13, wherein the item identification information is acquired by moving the item on a preset path and positioning the scanning device to scan a specific region on a movement path of the item.

15. The information processing method of claim 9, further comprising:
based on determining that the reliability score satisfies the threshold, providing the item identification information such that the reception of the item is processed at the target fulfillment center.

16. The information processing method of claim 1, wherein the inventory check is performed at the target fulfillment center by comparing the first information with item identification information on the device corresponding to a target fulfillment center.

17. A non-transitory computer-readable recording medium on which a program for executing the information processing method of claim 1 by a computer is recorded.

18. An electronic apparatus that processes information, the electronic apparatus comprising:
a transceiver;
a memory configured to store instructions; and
a processor, connected to the transceiver and memory, wherein the processor is configured, when executing the instructions, to cause the electronic apparatus to:
receive, from a device of a user that supplies items, first information related to supply including (i) information on a target fulfillment center to which an item is to be supplied and (ii) information on the item;
determine, based on the first information, a delivery type of the supply;
predict scheduled arrival time information of the item according to the supply according to a method corresponding to the determined delivery type of the supply, wherein the instructions to predict the scheduled arrival time information, when executed, cause the electronic apparatus to:
train, using training data corresponding to predicting scheduled arrival time information for an item, a machine learning model to predict scheduled arrival time information based on the first information, the delivery type, and the information on the target fulfillment center;
predict, using the trained machine learning model and based on the first information, the delivery type, and the information on the target fulfillment center, scheduled arrival time information for the item; and
provide second information including the information on the item and the predicted scheduled arrival time information to the device corresponding to the target fulfillment center;
acquire a reliability score corresponding to the user;
based on a determination that the reliability score fails to satisfy a threshold, transmit, to the device corresponding to a target fulfillment center, an indication to perform an inventory check at the target fulfillment center when the item is processed;
determining manpower allocation information corresponding to the target fulfillment center based on the second information;
retraining, based on the manpower allocation information corresponding to the target fulfillment center, the machine learning model;
predicting, based on retrained machine learning model, an updated scheduled arrival time information for the item; and
based on predicting the updated scheduled arrival time information, transmit the updated scheduled arrival time information to the target fulfillment center.

* * * * *